US012762622B2

(12) United States Patent
Chityala

(10) Patent No.: US 12,762,622 B2
(45) Date of Patent: Oct. 13, 2026

(54) METHODS AND SYSTEMS FOR OPTIMIZED AND DIVERSIFIED PORTFOLIOS

(71) Applicant: Aditya Chityala, Toronto (CA)

(72) Inventor: Aditya Chityala, Toronto (CA)

( * ) Notice: Subject to any disclaimer, the term of this patent is extended or adjusted under 35 U.S.C. 154(b) by 0 days.

(21) Appl. No.: 18/980,926

(22) Filed: Dec. 13, 2024

(65) Prior Publication Data

US 2026/0127673 A1 May 7, 2026

Related U.S. Application Data

(60) Provisional application No. 63/716,541, filed on Nov. 5, 2024.

(51) Int. Cl.
*G06Q 40/06* (2012.01)

(52) U.S. Cl.
CPC .................................... *G06Q 40/06* (2013.01)

(58) Field of Classification Search
CPC ...................................................... G06Q 40/06
See application file for complete search history.

(56) References Cited

U.S. PATENT DOCUMENTS 7,624,060 B2 11/2009 Michaud et al.
7,853,510 B2 12/2010 Zosin et al.
8,170,935 B2 5/2012 Weber et al.
8,401,950 B2 3/2013 Lyons et al.
12,406,308 B2 * 9/2025 Jha ......................... G06Q 40/06
12,518,319 B2 * 1/2026 Gerber ................... G06Q 40/06
2005/0108134 A1 * 5/2005 Harlow .................. G06Q 40/06 705/36 R
2012/0246094 A1 9/2012 Hsu et al.
2015/0088783 A1 * 3/2015 Mun ...................... G06Q 40/02 705/36 R
2016/0086278 A1 * 3/2016 Renshaw ............... G06Q 40/04 705/36 R
2024/0153006 A1 * 5/2024 Zhu ........................ G06N 20/00
2024/0403954 A1 * 12/2024 Pan ........................ G06N 3/045
2025/0363362 A1 * 11/2025 Galvin .................. G06N 3/082

OTHER PUBLICATIONS

Maysam Khodayari Gharanchaei and Reza Babazadeh; "Crisis Alpha: A High-Performance Trading Algorithm Tested in Market Downturns"; Aug. 18, 2024; arXiv:2409.14510 (Cornell University); p. 3 (Year: 2024).*

* cited by examiner

*Primary Examiner* — Scott S Trotter
(74) *Attorney, Agent, or Firm* — Aird & Berlis LLP

(57) ABSTRACT

A computer-implemented method for optimizing a composition of an investment portfolio, comprising: receiving a risk tolerance level for the investment portfolio; receiving an investment objective; determining constraints for the investment portfolio based on the risk tolerance level; receiving a selection of a previously curated core portfolio; receiving a selection of one or more assets to add to the core portfolio, to generate the investment portfolio; determining if the investment portfolio satisfies the constraints, and if so: receiving a selection of a benchmark portfolio comprising the core portfolio or another selected portfolio; obtaining market data for (i) the core portfolio, and (ii) the investment portfolio; performing Principal Component Analysis (PCA) on the core portfolio market data to determine a first number of independent factors contributing to returns thereof; and performing said PCA on the investment portfolio market data to determine a second number of independent factors contributing to returns thereof.

20 Claims, 4 Drawing Sheets

METHODS AND SYSTEMS FOR OPTIMIZED AND DIVERSIFIED PORTFOLIOS

FIELD

The following relates generally to methods and systems for optimizing the composition of financial investment portfolios.

BACKGROUND

Current methods for optimizing the makeup or composition of investment portfolios require the development of a portfolio from scratch, or limit the performance analysis of a portfolio in a manner that may unduly constrain the number of independent factors that could drive returns for the portfolio. Further, many such known methods do not account for an investor's risk appetite, nor utilize Principal Component Analysis (PCA) to both determine a minimum set of independent factors in a pre-established core or benchmark portfolio and to further analyze an investment portfolio derived in part therefrom (for tracking by an investor) to determine if there is an increase in the number of independent factors driving returns, while also tracking the performance of the investment portfolio. Further, such known methods tend not to provide recommendations and/or flexibility to further refine the investment portfolio based on the two-step PCA analysis and/or market performance analysis. Further still, such known methods do not generally allow for a simplified process (such as a digital value selector) allowing investors to quickly reallocate the assets within the investment portfolio while remaining within constraints that conform to the investor's risk appetite.

SUMMARY

In an aspect there is provided a computer-implemented method comprising a processor and a non-transitory computer-readable medium, the method for optimizing a composition of an investment portfolio, the method comprising: receiving a risk tolerance level for the investment portfolio; receiving an investment objective; determining constraints for the investment portfolio based on the risk tolerance level; receiving a selection of a previously curated core portfolio; receiving a selection of one or more assets to add to the core portfolio, to generate the investment portfolio; determining if the investment portfolio satisfies the constraints; if the investment portfolio satisfies the constraints: receiving a selection of a benchmark portfolio comprising the core portfolio or another selected portfolio; obtaining market data for (i) the core portfolio and benchmark portfolio, and (ii) the investment portfolio; performing Principal Component Analysis (PCA) on the core portfolio market data to determine a first number of independent factors contributing to returns of the core portfolio; and performing said PCA on the investment portfolio market data to determine a second number of independent factors contributing to returns of the investment portfolio.

In another aspect there is provided a system for optimizing a composition of an investment portfolio, the system comprising: at least one optimization computing device comprising one or more processors, a non-transitory computer readable medium and a communication interface device, the one or more processors communicatively coupled to the non-transitory computer readable medium and the communication interface device; the non-transitory computer-readable medium comprising computer-executable instructions stored thereon that when executed by the one or more processors cause the one or more processors to: receive, via the communication interface device, a risk tolerance level for the investment portfolio; receive, via the communication interface device, an investment objective; determine constraints for the investment portfolio based on the risk tolerance level; receive, via the communication interface device, a selection of a previously curated core portfolio; receive, via the communication interface device, a selection of one or more assets to add to the core portfolio, to generate the investment portfolio; determine if the investment portfolio satisfies the constraints; if the investment portfolio satisfies the constraints: receive, via the communication interface device, a selection of a benchmark portfolio comprising the core portfolio or another selected portfolio; obtain, via the communication interface device, market data for (i) the core portfolio and the benchmark portfolio, and (ii) the investment portfolio; perform Principal Component Analysis (PCA) on the core portfolio market data to determine a first number of independent factors contributing to returns of the core portfolio; and perform said PCA on the investment portfolio market data to determine a second number of independent factors contributing to returns of the investment portfolio.

In a further aspect there is provided a computer-implemented method for optimizing an investment portfolio composition, the method comprising: receiving, from a user, a risk tolerance level for the investment portfolio; receiving, from the user, an investment objective; determining constraints for the investment portfolio based on the risk tolerance level; receiving, from the user, a selection of a previously curated core portfolio; receiving, from the user, a selection of one or more assets to add to the core portfolio, to generate the investment portfolio; determining if the investment portfolio satisfies the constraints; if the investment portfolio satisfies the constraints: receiving, from the user, a selection of a benchmark portfolio comprising the core portfolio or another portfolio selected by the user; obtaining market data for (i) the core portfolio and the benchmark portfolio, and (ii) the investment portfolio; performing Principal Component Analysis (PCA) on the core portfolio market data to determine a first number of independent factors contributing to returns of the core portfolio; performing said PCA on the investment portfolio market data to determine a second number of independent factors contributing to returns of the investment portfolio; determining if the second number of independent factors is greater than the first number of independent factors; if the second number of independent factors is greater than the first number of independent factors: receiving input from the user of an optimization type for asset allocation of the investment portfolio; receiving input from the user of minimum and maximum allocation of each asset in the investment portfolio; analyzing performance of the investment portfolio; if the performance of the investment portfolio is below a threshold performance, recommending a new minimum and/or maximum allocation of said each asset in the investment portfolio and/or a new said optimization type for the investment portfolio, based on the analyzing of the performance of the investment portfolio; and receiving an acceptance from the user of the recommendation of the new minimum and/or maximum allocation of said each asset in the investment portfolio and/or the new optimization type, to generate an optimized investment portfolio.

In yet another aspect there is provided a system for optimizing an investment portfolio composition, the system comprising: at least one optimization computing device comprising one or more processors, a non-transitory memory and a communication module, the one or more processors communicatively coupled to the non-transitory memory and the communication module; the non-transitory memory comprising computer-executable instructions that when executed by the one or more processors cause the one or more processors to: receive, via the communication module from a user computing device over a network, a risk tolerance level for the investment portfolio; receive, via the communication module from the user computing device over the network, an investment objective; determine constraints for the investment portfolio based on the risk tolerance level; receive, via the communication module from the user computing device over the network, a selection of a previously curated core portfolio; receive, via the communication module from the user computing device over the network, a selection of one or more assets to add to the core portfolio, to generate the investment portfolio; determine if the investment portfolio satisfies the constraints; if the investment portfolio satisfies the constraints: receive, via the communication module from the user computing device over the network, a selection of a benchmark portfolio comprising the core portfolio or another portfolio selected by a user of the user computing device; obtain, over the network via the communication module from one or more market data databases, market data for (i) the core portfolio and the benchmark portfolio, and (ii) the investment portfolio; perform Principal Component Analysis (PCA) on the core portfolio market data to determine a first number of independent factors contributing to returns of the benchmark portfolio; perform said PCA on the investment portfolio market data to determine a second number of independent factors contributing to returns of the investment portfolio; determine if the second number of independent factors is greater than the first number of independent factors; if the second number of independent factors is greater than the first number of independent factors: receive, via the communication module from the user computing device over the network, input of an optimization type for asset allocation of the investment portfolio; receive, via the communication module from the user computing device over the network, input of minimum and maximum allocation of each asset in the investment portfolio; analyze performance of the investment portfolio; if the performance of the investment portfolio is below a threshold performance, recommend a new minimum and/or maximum allocation of said each asset in the investment portfolio and/or a new said optimization type for the investment portfolio, based on the analysis of the performance of the investment portfolio; and receive, via the communication module from the user computing device over the network, an acceptance of the recommendation of the new minimum and/or maximum allocation of said each asset in the investment portfolio and/or the new optimization type, to generate an optimized investment portfolio.

BRIEF DESCRIPTION OF THE DRAWINGS

Aspects of the present disclosure will now be described by way of example only with reference to the appended drawings in which.

DETAILED DESCRIPTION

Figure 1:
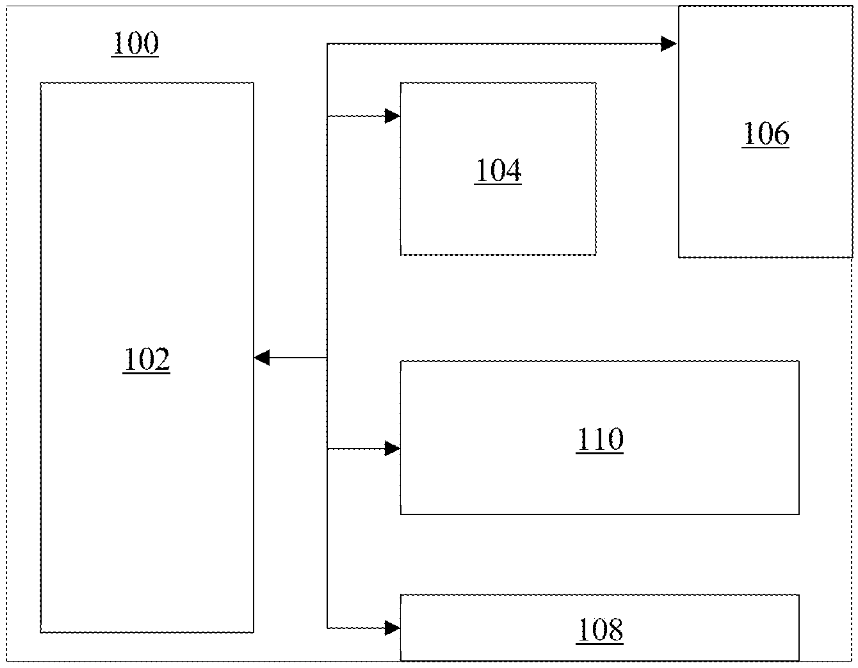
FIG. 1 depicts a schematic diagram of an example of an investment optimization computing device described herein.

Unless otherwise explained, all technical and scientific terms used herein have the same meaning as commonly understood by one of ordinary skill in the art to which this disclosure belongs. Although any methods and materials similar or equivalent to those described herein may be used in the practice for testing or implementing the present invention, the typical materials and methods are described herein.

It is also to be understood that the terminology used herein is for the purpose of describing particular aspects only and is not intended to be limiting. Any patent applications, patents, and publications cited herein are to assist in understanding the aspects described. All such references cited herein are incorporated herein by reference in their entirety and for all purposes to the same extent as if each individual publication or patent or patent application was specifically and individually indicated to be incorporated by reference in its entirety for all purposes. To the extent publications and patents or patent applications incorporated by reference contradict the disclosure contained in the specification, the specification is intended to supersede and/or take precedence over any such contradictory material.

In understanding the scope of the present application, the articles "a", "an", "the", and "said" are intended to mean that there are one or more of the elements. Additionally, the term "comprising" and its derivatives, as used herein, are intended to be open-ended terms that specify the presence of the stated features, elements, components, groups, integers, and/or steps, but do not exclude the presence of other unstated features, elements, components, groups, integers, and/or steps. The foregoing also applies to words having similar meanings such as the terms, "including", "having" and their derivatives.

It will be understood that any aspects described as "comprising" certain components may also "consist of" or "consist essentially of," wherein "consisting of" has a closed-ended or restrictive meaning and "consisting essentially of" means including the components specified but excluding other components except for materials present as impurities, unavoidable materials present as a result of processes used to provide the components, and components added for a purpose other than achieving the technical effect of the invention.

It will be understood that any component defined herein as being included may be explicitly excluded from the claimed invention by way of proviso or negative limitation. In addition, all ranges given herein include the ends of the ranges and also any intermediate range points, ranges or values within the stated ranges, whether explicitly stated or not.

Terms of degree such as "substantially", "about" and "approximately" as used herein mean a reasonable amount of deviation of the modified term such that the end result is not significantly changed. These terms of degree should be construed as including a deviation of at least ±5% of the modified term if this deviation would not negate the meaning of the word it modifies.

The abbreviation, "e.g." is derived from the Latin phrase exempli gratia, and is used herein to indicate a non-limiting example. Thus, the abbreviation "e.g." is synonymous with the term "for example." The word "or" is intended to include "and" unless the context clearly indicates otherwise.

Described herein are computer-implemented methods, systems and devices for building low touch, low volatility, balanced, and diversified financial investment portfolios with minimal idiosyncratic risk within a relatively short timeframe (e.g., 30 minutes to an hour). In an aspect, a portfolio is built taking into consideration a risk tolerance, objective and/or account type (such as may be received from a user, e.g., an investor or some other type of user, such as a potential investor, tester, etc.). In an aspect, the investment portfolio is built using a two-step Principal Component Analysis (PCA) process, in which PCA is first performed on a core portfolio which comprises previously curated assets, to determine a minimum number of independent factors driving returns for the core portfolio. A test or simulated investment portfolio is created by adding further assets to the core portfolio, and performance of the investment portfolio may be gauged by comparison to performance of a benchmark portfolio (which may comprise the core portfolio or another selected portfolio, such as may be selected by the user). In building the investment portfolio, the presently described aspects check for conformance to constraints that depend on the risk tolerance. A further PCA is performed on the simulated investment portfolio to determine if the number of independent factors has increased relative to the core portfolio, and if so, an optimization type for the investment portfolio may be selected (e.g., does the user want to maximize returns or income, minimize volatility, etc.), and a minimum and maximum allocation of each asset in the simulated investment portfolio may be set by setting the value of a single digital value selector (e.g., by setting a single value between a minimum and maximum, the weights of the assets in the portfolio can be adjusted to, e.g., equal weights per asset (which may be represented by a minimum value, such as zero) to a maximum value representing a maximum range between the minimum and maximum allocation for each asset in the investment portfolio based on the risk tolerance level. The presently described aspects may also track performance of the investment portfolio and the benchmark portfolio, and make recommendations for the value of the digital value selector and/or optimization type based on the performance analysis results, which if accepted, yield an optimized (or further optimized) investment portfolio. The above only generally describes one particular example of the presently described aspects.

The computer-implemented methods, systems and devices described herein are expected to provide a user with several investment options for generating a simulated or practice investment portfolio, help to ensure investment discipline and rigor, and provide controls for the user's risk tolerance in multiple ways, including, but not limited to: selection of asset class(es); the ability to establish a maximum exposure to any individual asset class; and the ability to establish a maximum exposure to any individual asset (e.g., an ETF). The present methods, systems and devices may provide recommendations, such as to a user, to optimize the investment portfolio allocation to generate an optimized (or further optimized) simulated or practice investment portfolio, and further, track the simulated investment portfolio's performance so that whenever the user is comfortable with the performance of the portfolio, they may invest in the investment portfolio that has been optimized by the presently described methods, systems and devices.

Figure 2:
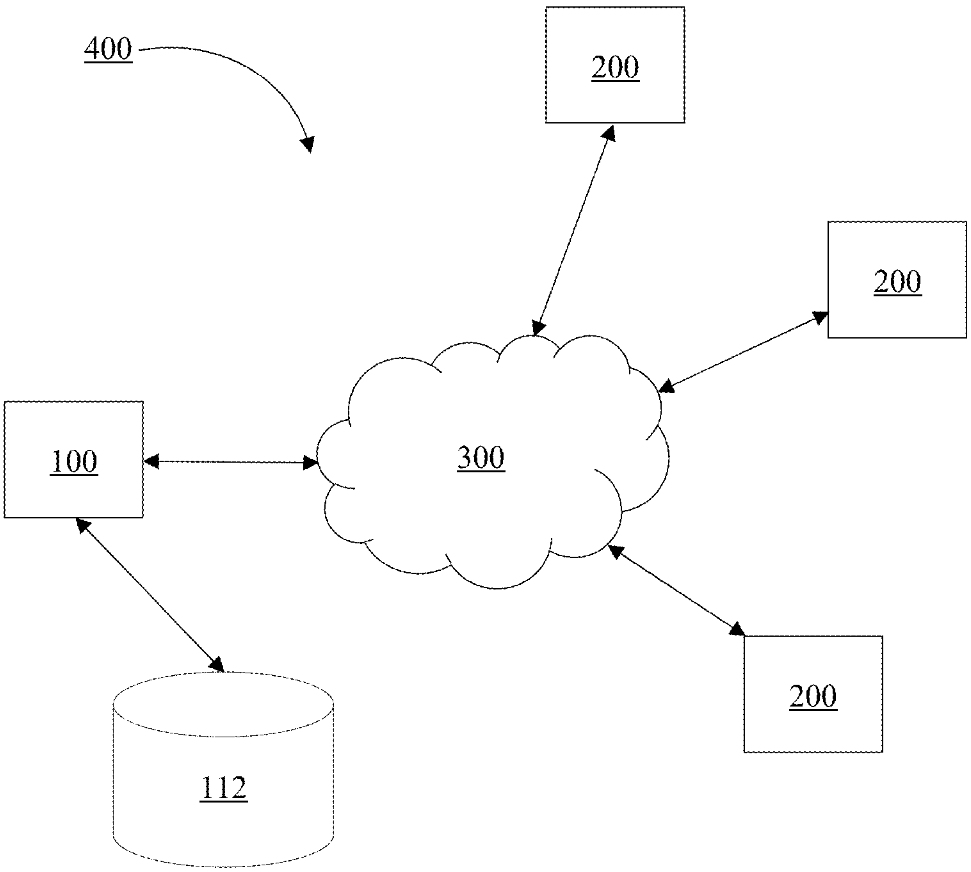
FIG. 2 depicts a schematic diagram of an example of a system described herein.

With reference to FIGS. 1 and 2, in accordance with some aspects, at least one optimization computing device 100 for carrying out the method(s) described herein may comprise one or more processors 102, a non-transitory computer-readable medium 104 comprising computer executable instructions, and a communication interface device 106. The optimization computing device(s) 100 may further comprise an input/output (I/O) interface 108 for receiving inputs via input device(s) (e.g., a keyboard, mouse, touchpad, touchscreen, voice input system, and/or any other manner of providing inputs) and transmitting output(s) from the optimization computing device(s) 100 to output devices (e.g., speakers, displays, etc.), and a display 110 (which may also comprise an output, or an input (e.g. where the display comprises a touch screen)), for example. The one or more processors 102 may be communicatively coupled to the computer-readable medium 104 and the communication interface device 106, and in further aspects, to the input device(s) and output device(s), via the I/O interface 108, and the display 110. Communicative coupling may be by any known method, such as communication buses for communication between components co-located on the same circuit board, or a combination of buses and network-based communications (using any suitable protocol for wired or wireless communication, as further described herein with respect to network 300), where communicating components are not co-located on the same circuit board.

The optimization computing device(s) 100 may comprise one or more servers, one or more computers, or any combination thereof suitable for carrying out the method steps described herein, and in a system 400 for optimizing an investment portfolio composition, as shown in FIG. 2, the optimization computing device(s) 100 may be communicatively coupled to one or more databases 112 and user computing device(s) 200 over network(s) 300. For example, an optimization computing device 100 may be communicatively coupled to a market data database 112 over a network 300, as described in greater detail below. The user computing devices 200 may comprise digital computing devices of users of the presently described methods, systems and devices, such as a user's desktop, laptop or tablet computer (in which case the presently described computer-implemented methods and systems may comprise, in part, a software-based web portal) and/or, e.g., a smartphone (in which case the presently described computer-implemented methods and systems may comprise, in part, a software-based app accessible via smart phones through app stores, for example). The presently described computer-implemented methods and systems may comprise software-as-a-service accessible over the network 300.

The non-transitory computer-readable medium 104 of the optimization computing device(s) 100 may comprise computer-executable instructions stored on the computer-readable medium 104, that when executed by the one or more processors 102 may cause the one or more processors 102 to carry out the various method steps described herein. For example, referring to FIG. 3, in accordance with some aspects there is provided a computer-implemented method 500 for optimizing a composition of an investment portfolio. The method 500 may comprise, in some aspects, steps for understanding the user's risk tolerance and investment objectives, including: receiving (such as from a user) a risk tolerance level for the investment portfolio (e.g., low, medium or high, as described in further detail, below) (step 502); and receiving (such as from the user) an investment objective (e.g., whether to reinvest income earned when rebalancing the investment portfolio (i.e., at a rebalancing time), or whether to withdraw income earned at the rebalancing time) (step 504). Such "know your client" (KYC) steps of method 500 (an example of which is depicted in FIG. 4 as those steps bound by the dashed line) may in some aspects further comprise: receiving (such as from the user)

an account type for the investment portfolio (e.g., a Tax-Free Savings Account (TFSA), a Registered Retirement Savings Plan (RRSP), a Non-registered Savings Plan (NRSP), a Registered Education Savings Plan (RESP), a Registered Disability Savings Plan (RDSP), or any other types of accounts available in any jurisdictions and any security class, such as those with minimal idiosyncratic risk (e.g., Mutual Funds, Index Funds, etc.)) (step 503); and receiving (such as from the user) an investment amount for the investment portfolio (step 505).

In some aspects, method 500 may further comprise: determining constraints for the investment portfolio based on the risk tolerance level (step 506); receiving (such as from the user) a selection of a previously curated core portfolio (step 508); receiving (such as from the user) a selection of one or more assets (such as securities) to add to the core portfolio, to generate the investment portfolio (step 510); and determining if the investment portfolio satisfies the constraints (step 511).

In some aspects, the previously curated core portfolio (such as, e.g., an exchange-traded fund (ETF) portfolio) may comprise a defensive portfolio with a minimum number of independent factors (e.g., three independent factors), such as from a diversification perspective, that contribute to returns of the core portfolio based on the greatest Eigen Values for at least a threshold percentage of the core portfolio's variance. In one example aspect, the core portfolio may contain, e.g., four ETFs in four asset classes. The core portfolio may comprise a pre-built diversified and balanced portfolio with very few securities that has already been vetted for a minimum number of independent factors. It is expected that such a core portfolio would provide a more meaningful benchmark to use than a traditional "60/40" equity/fixed income portfolio, with the presently described core portfolio allowing for a more relevant, "apples-to-apples" comparison to the investment portfolio.

By adding more assets to the core portfolio at step 510, to generate the investment portfolio, the number of independent factors contributing to returns is expected to be improved upon (as compared to the core portfolio) by adding more assets (e.g., securities) in this second step (the first step comprising receiving the selection of a previously curated core portfolio (step 508)).

The constraints may include, as an example only, limits on asset class exposure, the types of assets, and the maximum number of assets in the investment portfolio. For example, in an equal weights by ETF portfolio: (i) the maximum asset class exposure may not exceed a percentage limit that depends on the risk tolerance of the user; (ii) there may be no duplicate ETFs (e.g., both SPY and XSP.TO may not be present in the same portfolio); and (iii) there may be no more than 15 ETFs in the investment portfolio.

In some aspects, the method 500 may further comprise, if it is determined, at step 511, that the investment portfolio satisfies the constraints: receiving (such as from the user) a selection of a benchmark portfolio comprising the core portfolio or another selected portfolio (such as may be selected by a user of, e.g., the user computing device 200), the benchmark portfolio comprising a portfolio against which to gauge performance of the investment portfolio (step 512); obtaining, such as via the communication interface device 106 of an optimization computing device 100, such as from one or more market data database(s) 112 over a network 300, market data for (i) the core portfolio (or the core portfolio and the benchmark portfolio), and (ii) the investment portfolio (step 514). The market data for the benchmark portfolio may be required for the step of analyzing the performance of the investment portfolio (step 526) (which may comprise, e.g., analyzing the performance of the investment portfolio (i) in isolation and/or (ii) in relation to the benchmark portfolio), which is described further below. As such, the market data for the benchmark portfolio may be obtained in a separate step from step 514 or, as described above, with the step of obtaining market data for the core portfolio (step 514), for greater efficiency.

In some aspects, PCA is performed both on the core portfolio and the investment portfolio to gauge if there is an improvement in the number of independent factors contributing to returns as compared to the number of independent factors of the core portfolio, and this is expected to speed up the investment selection process, as the user does not have to create from scratch a balanced and diversified portfolio, but rather is able to build upon an existing core portfolio that already has been vetted for a minimum number of independent factors. As such, in some aspects, the method 500 may further comprise: performing Principal Component Analysis (PCA) on the core portfolio market data to determine a first number of independent factors contributing to returns of the core portfolio (step 516); and performing PCA on the investment portfolio market data to determine a second number of independent factors contributing to returns of the investment portfolio (step 518). In further aspects, the method 500 may further comprise: determining if the second number of independent factors is greater than the first number of independent factors (step 520). The step (at step 516) of performing PCA on the core portfolio market data to determine a first number of independent factors may be performed earlier by the user, at step 508.

In some aspects, the market data may comprise m+n years of end-of-day asset price and distribution data, where m years of market data are used for performing the PCA on the core portfolio and the investment portfolio (to determine the first number of independent factors and the second number of independent factors, as described above), and n years (which may be subsequent to the m years) of market data are used for analyzing the performance of the investment portfolio. In some aspects, a m+n data period may be between the date of the previous month end and the same date m+n years prior, for example. Yet other m+n market data periods may be used, and any values for m and n suitable for providing sufficient market data may be employed. For example, m may equal 5 years and n may equal 3 years, for a total of 8 years of market data ending on the previous month end. In an example aspect, PCA may be performed on the first m (e.g., 5) years of daily returns for individual ETFs in the core and investment portfolios, to identify the first and second numbers of independent factors, respectively.

In some aspects, once the investment portfolio has been selected using the two-step PCA investment selection process described above (wherein PCA is performed 516, 518 on the previously curated and selected core portfolio and also on the investment portfolio), the asset allocation may be optimized. In particular, in some aspects, if it is determined, at step 520, that the second number of independent factors is greater than the first number of independent factors, then it may be determined that the investment portfolio is more diversified than the core portfolio. Additionally, or alternatively, the method 500 may further comprise: receiving input (such as from the user) of an optimization type for asset allocation of the investment portfolio (step 522); receiving input (such as from the user) of minimum and maximum allocation of each asset in the investment portfolio (step 524); analyzing performance of the investment portfolio (step 526) (which may comprise, e.g., analyzing the performance of the investment portfolio (i) in isolation and/or (ii) in relation to the benchmark portfolio); if it is determined 527 that the performance of the investment portfolio is below a threshold performance (e.g., the Sharpe Ratio of the investment portfolio may be determined by the optimization computing device 100 to be at or below the Sharpe Ratio of the benchmark portfolio), recommending (such as via the communication interface device 106 of the optimization computing device 100, over the network 300 to the user computing device 200) a new minimum and/or maximum allocation of each asset in the investment portfolio and/or a new optimization type for the investment portfolio, based on the analysis of the performance of the investment portfolio (step 528) (e.g., to provide more diversification within the investment portfolio, if determined to be necessary based on the performance analysis at steps 526 and 527); and determining if an acceptance has been received (such as from the user) of the recommendation of the new minimum and/or maximum allocation of each asset in the investment portfolio and/or the new optimization type, to generate an optimized investment portfolio (step 530). When the acceptance is received at step 530, the recommended new minimum and/or maximum allocation of each asset in the investment portfolio and/or new optimization type for the investment portfolio may be set and saved by the optimization computing device 100 (see, e.g., steps 530 (the "Yes" decision branch), 524 and 532 in FIG. 4).

The risk tolerance level for the investment portfolio may comprise, e.g., a low risk tolerance, a medium risk tolerance or a high risk tolerance, and yet other levels of risk may be included. In some aspects, each of the risk tolerance levels (e.g., each of the low, medium and high risk tolerance levels) may comprise different constraints reflecting the respective risk level. As an example only, in some aspects, the constraints determined 506 for the investment portfolio based on the risk tolerance level may comprise: (A) for the low risk tolerance, (i) available asset classes may comprise equities, preferred shares, fixed income, and/or Real Estate Investment Trust (REIT), (ii) maximum asset class exposure for any one asset class may comprise 35%, and (iii) for the recommendation 528, volatility may not be higher than a benchmark volatility of the benchmark portfolio by a factor of 10%; (B) for the medium risk tolerance, (i) the available asset classes may comprise equities, preferred shares, fixed income, and/or REIT, (ii) the maximum asset class exposure for any one asset class may comprise 40%, and (iii) for the recommendation 528, the volatility may not be higher than a benchmark volatility of the benchmark portfolio by a factor of 20%; and (C) for the high risk tolerance, (i) the available asset classes may comprise equities, preferred shares, fixed income, REIT, hybrid, energy, precious metals, and/or other metals, (ii) the maximum asset class exposure for any one asset class may comprise 40%, and (iii) for the recommendation 528, the volatility may not be higher than a benchmark volatility of the benchmark portfolio by a factor of 20%. Yet other variables, percentages, and features may be attributed to each level of risk tolerance (including ranges of percentages, such as a range for maximum asset class exposure for any one asset class of 25-35%, or for the volatility for the recommendation 528 not exceeding that of the benchmark portfolio by a factor of 10-15%, or some other suitable range(s), for example), and the above is provided as one example only. Generally, for the maximum asset class exposure for any one asset class (which, for each of the low, medium and high risk levels comprises the low, medium or high risk maximum asset class exposure percentage), a low risk maximum asset class exposure percentage may be less than or equal to that of a medium risk maximum asset class exposure percentage which in turn may be less than or equal to that of a high risk maximum asset class exposure percentage. Similarly, regarding the requirement that, for the recommendation 528, the volatility may not be higher than a benchmark volatility of the benchmark portfolio by a factor of a percentage (the volatility threshold percentage, which, for each of the low, medium and high risk levels comprises the low, medium or high risk volatility threshold percentage), the low risk volatility threshold percentage may be less than or equal to the medium risk volatility threshold percentage which in turn may be less than or equal to the high risk volatility threshold percentage. At the step of receiving, from the user, a selection of one or more assets to add to the core portfolio, to generate the investment portfolio (step 510), the assets made available to the user for selection may be limited by the optimization computing device 100 so as to comply with the risk tolerance level and investment objective received 502, 504 from the user.

The optimization type for the asset allocation of the investment portfolio may comprise any manner of optimizing the allocation of the assets in the investment portfolio, including, e.g.: (i) equal weights by individual assets (e.g., equal weights of ETFs); (ii) equal weights by asset class (e.g., equal weights of ETFs and equities); (iii) maximize returns (such as based on CAGR (Compound Annual Growth Rate)); (iv) maximize returns based on income; (v) minimize portfolio variance (or minimize overall volatility); and/or (vi) minimize taxes on income from a non-registered income portfolio.

In some aspects, the input from the user (and the recommendation 528 from the optimization computing device 100) of the minimum and maximum allocation of each asset in the investment portfolio may comprise a value that simultaneously sets the possible range for the allocation of each asset, preferably while satisfying the constraints set by the optimization computing device 100 based on the user's selected risk tolerance level, which is expected to facilitate the re-allocation of assets within the investment portfolio. The value that simultaneously sets the possible range for the allocation of each asset may comprise a value of a digital allocation input, which may comprise a digital input selector for selecting from amongst a plurality of values. For example, the asset allocation value may be set by a digital slider set by the user or the optimization computing device 100, as applicable. In some aspects, as the digital slider (for example) is moved across different values, the digital slider value may simultaneously set the possible range for the allocation of each asset. The value that simultaneously sets the possible range for the allocation of each asset (by, e.g., a digital allocation input) may, e.g., comprise, or be selected from a range of values from, a minimum value (e.g., zero) to a maximum value (e.g., 0.5). The minimum value may represent, e.g., equal weights of assets in the investment portfolio, and the maximum value may represent, e.g., a maximum range between a minimum and maximum allocation for each asset in the investment portfolio, based on the risk tolerance level. It will be appreciated that the digital allocation input may take any form, including a digital slider, knob, dial, and any other suitable form of accepting a digital input (and not necessarily selecting a value as a digital input), including a text input field. The digital allocation input may comprise, e.g., an ETF slider that sets ETF slider values (i.e., values for the allocations of each ETF in the investment portfolio). For example, in the ETF portfolio example, the ETF slider may allow for minimum and maximum allocation of each individual ETF, by allowing for values from 0 (equal weights by ETF) to 0.5 (which represents the maximum range between a minimum and maximum allocation of an asset according to the user's selected risk tolerance level) to be set. For example, in a 10 ETF portfolio, it may be that no individual ETF can have an allocation outside of the range of 5% to 15% of the total portfolio.

In some aspects, the recommended new minimum and/or maximum allocation of each individual asset in the investment portfolio (e.g., a new recommended digital allocation input value) and/or the recommended new optimization type for the investment portfolio (at step 528) may comprise a new minimum and/or maximum allocation and/or new optimization type that yields a Sharpe Ratio for the investment portfolio that is both (i) better than the Sharpe Ratio of the benchmark portfolio and (ii) maximized while satisfying the constraints (i.e., accounting for the user's risk tolerance level). This recommendation 528 comprises a second optimization of the investment portfolio, beyond the initial setting 522, 524 of the allocation type of, and the allocations of the assets in, the investment portfolio. In this way, an optimal digital allocation input value and optimization type for the investment portfolio may be determined, while the volatility of the investment portfolio is maintained within the tolerance level defined by the risk tolerance selected by the user (e.g., a low, medium or high risk tolerance level).

In some aspects, the method 500 may further comprise: tracking performance of the optimized investment portfolio and the benchmark portfolio (step 532); and communicating, such as via the communication interface device 106 of an optimization computing device 100 (such as to a user computing device 200 over a network 300), the optimized investment portfolio performance and the benchmark portfolio performance to the user of the user computing device 200 (step 534). Such tracking may be over a period of time, and may comprise the tracking of one or more performance metrics of the optimized investment and benchmark portfolios, such as YTD return, volatility, drawdown, and any other metrics of interest to the user, all of which may be published or communicated to the user at step 534 by the optimization computing device 100. In this way, the presently described aspects may comprise a simulation or simulator of an optimized investment portfolio's performance, and whenever the user is comfortable with the optimized investment portfolio's performance, they may decide to invest in the optimized investment portfolio.

Figure 3:
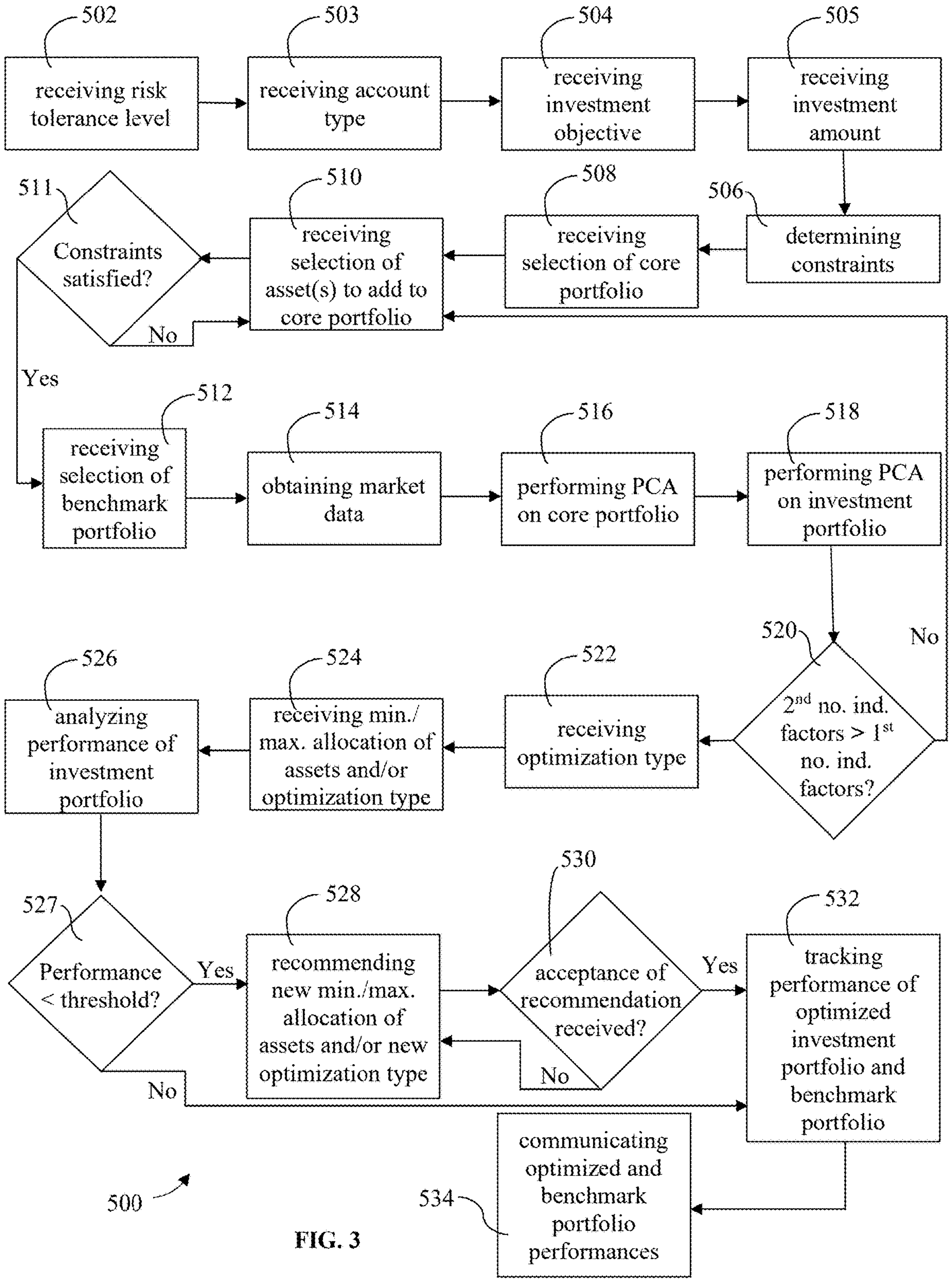
FIG. 3 depicts a flow diagram of an example of a method described herein.
Figure 4:
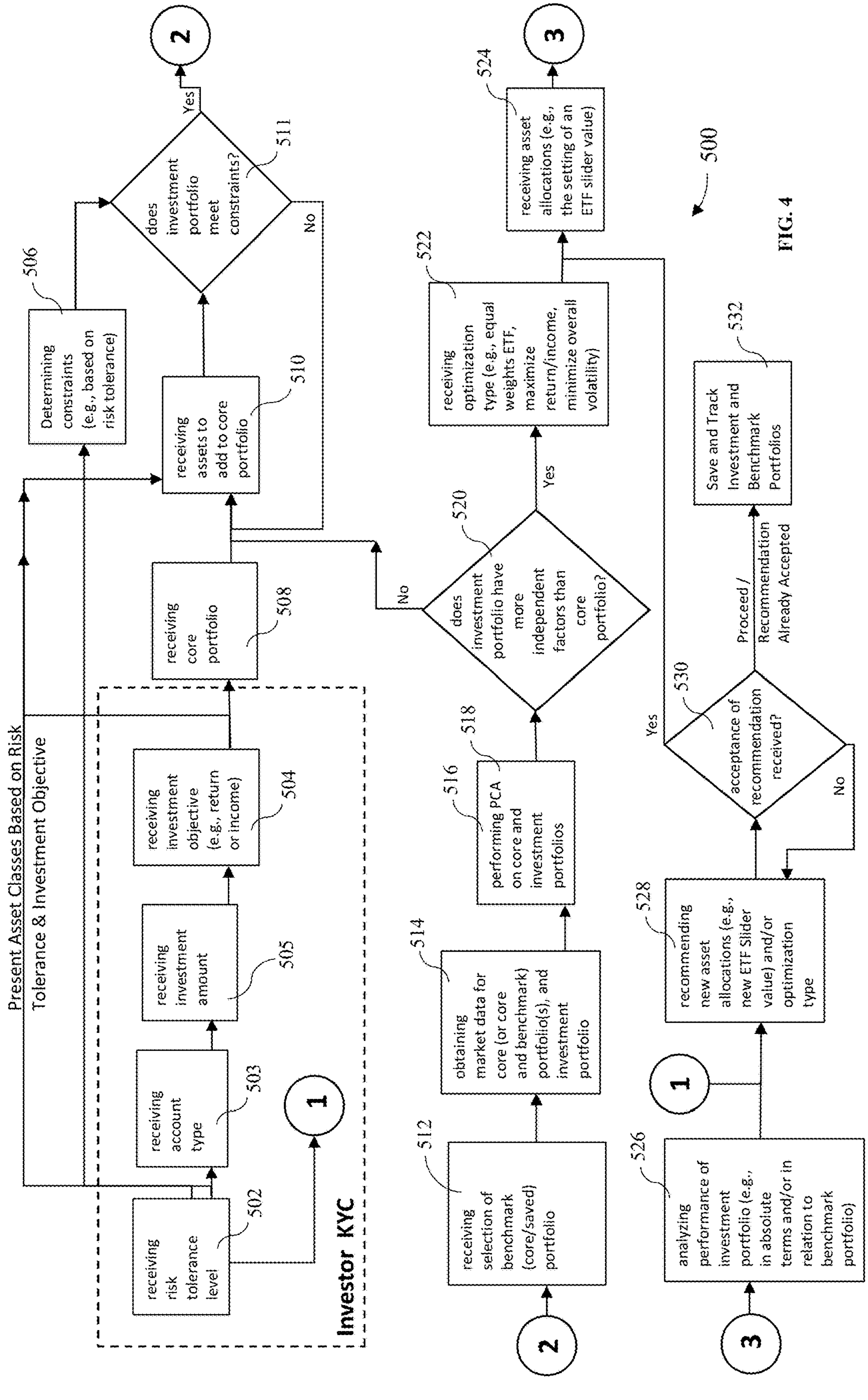
FIG. 4 depicts another flow diagram of an example of a method described herein.

Referring still to FIG. 3, if it is determined, at step 520, that the second number of independent factors (i.e., those determined 518 by performing PCA on the investment portfolio) is not greater than first number of independent factors (i.e., those determined 516 by performing PCA of the core portfolio), then the method 500 may return to step 510 (i.e., receiving, such as from the user, a selection of asset(s) to add to the core portfolio, to generate the investment portfolio (step 510), although in this case, the selection may comprise an amendment to the prior selection at step 510, whereby assets are added to or removed from those previously selected, or an entirely new set of assets is selected). In some aspects, if it is determined, at step 520, that the second number of independent factors is not greater than first number of independent factors, then the method 500 may also, or alternatively, comprise: providing, such as via the communication interface device 106 of an optimization computing device 100 to a user computing device 200 over a network 300, a recommendation for the selection (at step 510) of the one or more assets to add to the core portfolio (step 536), such as to provide more diversification to the investment portfolio to raise the number of independent factors driving returns for the investment portfolio. In some aspects, the recommendation provided at step 536, e.g.: (i) includes no more than one asset that is of a similar asset type (e.g., securities that are very similar to each other are not selected; e.g., if SPY (an ETF that tracks the S&P 500) has been selected, then an ETF such as VWO or XSP.TO (ETFs that also track S&P 500) are not selected); (ii) limits asset class exposure according to the optimization type for the asset allocation of the investment portfolio (e.g., the asset class exposure in an equal weights portfolio of the selected securities does not exceed the user's risk tolerance level, as defined in the "know your client" method steps); and/or (iii) does not exceed a configurable maximum number of assets for the investment portfolio (e.g., in order to keep the transaction costs at a reasonable level).

Any inputs received from a user of a user computing device 200 (such as, e.g., method steps 502, 503, 504, 505, 508, 510, 512, 522, 524, and 530) may, where applicable or suitable, be prompted for by the optimization computing device(s) 100, such as via a graphical user interface (GUI) rendered by a client instance of a software app and/or web portal accessible over the network 300 and served by the optimization computing device(s) 100. Any such steps described herein (e.g., where inputs are received from a user) may be effected by, e.g., receiving such inputs or information via the communication interface device 106 of an optimization computing device 100, such as from a user computing device 200 of the user, over a network 300.

Any of the processors described herein, including the processor(s) 102 of the optimization computing device(s) 100 and the processor(s) of any user computing device 200 or of any other system 400 component (including, e.g., the database(s) 112), may comprise any suitable computing or processing device for carrying out any of the method steps or other actions described herein by any of the components described herein, such as central processing units (CPUs), graphics processing units (GPUs), programmable logic devices (PLDs) such as complex programmable logic devices (CPLDs) or field-programmable gate arrays (FPGAs), application-specific integrated circuits (ASICs), programmable logic controllers (PLCs), any other device capable of digital processing, or any combination thereof.

Any computer-readable medium described herein, including the computer-readable medium 104 and the computer-readable medium of any user computing device 200 or any other system 400 component (including, e.g., the database(s) 112), may comprise any suitable form of non-transitory computer-readable storage medium for storing computer-executable instructions for execution by any of the processors described herein to carry out any of the method steps or other actions described herein, and further to store any of the information or data described herein that is required by the described methods or other actions, or otherwise capable of, storage in memory. The computer-readable media described herein, including the computer-readable medium 104, may comprise, e.g., one or more of a local and/or remotely accessible (such as over the network 300) hard disk or hard drive, of any type, ROM (read-only memory) and/or RAM (random-access memory), buffer(s), register(s), cache(s), removable disk(s), flash memory, compact disk(s), programmable memory (PROM), EPROM, EEPROM, optical memory (e.g., CD(s) and DVD(s)), and any other form of volatile or non-volatile storage medium in or on which information may be stored for any duration. The processors described herein, including processor(s) 102, and the associated memories (including computer-readable medium 104) may be co-located on respective circuits, separate components connected by appropriate electrical cable connections for effecting the appropriate communications protocols, and/or remotely connected via the network 300.

The communication interface devices described herein, including communication interface device 106 and the communication interface devices of any user computing device 200 or any other system 400 component (including, e.g., the database(s) 112), may enable the computing devices 100, 200 and any other devices of system 400, such as any databases 112, or components thereof, to communicate with one or more other components of the system 400 via a wired and/or wireless communication network 300. The network 300 may comprise a direct link between communicating components of the system 400 and/or an indirect one, including but not limited to communication by Ethernet™, Bluetooth™, WiFi™, WiMAX™ (fixed or mobile), and any suitable cellular communications protocols capable of data transfer, including, but not limited to, up to at least 5G protocols, such as GSM, GPRS, EDGE, CDMA, UMTS, LTE, LTE-A, and IMS, for example, and any other communications protocols suitable for the method(s), system(s) and device(s) described herein, including any proprietary protocols. The network 300 may comprise a single network or more than one interconnected network, of any type suitable for the method(s), system(s) and device(s) described herein, including but not limited to wired or wireless LANs (local area networks), WANs (wide area networks), MANs (metropolitan area networks), mesh or ad hoc networks, VPNs (virtual private networks), the Internet, and any other suitable network type, in any suitable network configuration or topology (e.g., mesh, token ring, tree, star, etc.), and any suitable combination of the foregoing. Although not shown in the figures, the system 400 may further include any components necessary to effect the communication(s) and/or network 300 type(s) used, and may also include components for increased network security, for example, access points, routers, and firewalls and their associated security protocols.

The presently described methods, systems and devices are expected to allow for a low touch, low volatility, balanced and diversified investment portfolio to be optimized by a two-step optimization process (the initial setting 522, 524 of the allocation type of, and the allocations of the assets in, the investment portfolio comprising an initial optimization, and the later recommendation 528 of revised values for the allocation type and asset allocations for the investment portfolio comprising a second optimization of the investment portfolio) and a two-step PCA process (steps 516 and 518), resulting in minimal idiosyncratic risk, and because the presently described methods utilize a previously curated core portfolio that is vetted for a certain minimum number of independent factors that drive returns, it is expected that the presently described methods, systems and devices may yield an optimized investment portfolio within 30 minutes to an hour, or some other timeframe that is shorter than other known techniques for portfolio composition optimization. The optimized investment portfolio is built taking into consideration at least a risk tolerance and investment objective, and yet other factors may also be considered, such as account type, all of which may be received from a user. The investment portfolio is built using a unique 2-step process involving Principal Component Analysis (PCA), and also generates a benchmark against which to compare the performance of the investment portfolio. The presently described methods, systems and devices are expected to provide the user with several investment options, help to maintain investment discipline and rigor, and provide controls for the risk tolerance in multiple ways, such as the selection of asset class, the maximum exposure to any individual asset class, and the maximum exposure to any individual asset (e.g., ETF). Further, in some aspects, the presently described methods, systems and devices are expected to provide recommendations to users (such as investors) to fine tune the investment portfolio allocation and which, if accepted, yields an optimized investment portfolio the performance of which may be simulated by the optimization computing device(s) 100 and tracked by the user (along with the benchmark portfolio performance, if desired), so that when the user is comfortable with the performance of the optimized investment portfolio, they may choose to invest in the optimized investment portfolio.

Any method steps described herein may be performed in any suitable sequence, order or arrangement, despite that particular example sequences, orders or arrangements have been shown and/or described herein. For example, method 500 is shown in FIG. 4 in a sequence of steps that is different from that shown in FIG. 3. As an example, the determining of the constraints (step 506) may, in some aspects, be performed immediately after receiving the user's risk tolerance level input (step 502). Yet other suitable arrangements of the method 500 steps may be employed and are within the scope of the present disclosure.

What is claimed is:

1. A computer-implemented method for optimizing a composition of an investment portfolio, with a processor and a non-transitory computer readable medium storing instructions executable by the processor to carry out the operations of:

receiving a risk tolerance level for the investment portfolio;

receiving an investment objective;

determining constraints for the investment portfolio based on the risk tolerance level;

receiving a selection of a previously curated core portfolio;

receiving a selection of one or more assets to add to the core portfolio, to generate the investment portfolio;

determining if the investment portfolio satisfies the constraints;

if the investment portfolio satisfies the constraints:

receiving a selection of a benchmark portfolio comprising the core portfolio or another selected portfolio;

obtaining market data for (i) the core portfolio and the benchmark portfolio, and (ii) the investment portfolio;

performing Principal Component Analysis (PCA) on the market data of the core portfolio to generate a first factor model having a first number of independent factors representing or exceeding a threshold percentage of portfolio variance;

performing said PCA on the market data of the investment portfolio to generate a second factor model having a second number of independent factors representing or exceeding said threshold percentage of portfolio variance;

comparing the second number of independent factors to the first number of independent factors;

and conditionally initiating an automated portfolio optimization operation only when the second number of independent factors exceeds the first number of independent factors, and wherein the automated portfolio optimization operation comprising generating recommended asset allocation constraints for the investment portfolio.

2. The computer-implemented method of claim 1 further comprising:

determining if the second number of independent factors is greater than the first number of independent factors;

if the second number of independent factors is greater than the first number of independent factors:

receiving input of an optimization type for asset class allocation of the investment portfolio;

receiving input of minimum and maximum allocation of each asset in the investment portfolio;

analyzing performance of the investment portfolio;

if the performance of the investment portfolio is below a threshold performance, recommending a new minimum and/or maximum allocation of said each asset in the investment portfolio and/or a new said optimization type for the investment portfolio, based on the analyzing of the performance of the investment portfolio; and receiving an acceptance of the recommendation of the new minimum and/or maximum allocation of said each asset in the investment portfolio and/or the new optimization type, to generate an optimized investment portfolio.

3. The computer-implemented method of claim 1 wherein the investment objective comprises: (i) reinvest income earned at a rebalancing time; or (ii) withdraw the income earned at the rebalancing time.

4. The computer-implemented method of claim 2 wherein the risk tolerance level for the investment portfolio comprises a low risk tolerance, a medium risk tolerance or a high risk tolerance.

5. The computer-implemented method of claim 4 wherein the constraints determined for the investment portfolio based on the risk tolerance level comprise, for the low risk tolerance:

available asset classes comprise equities, preferred shares, fixed income, and/or Real Estate Investment Trust (REIT), maximum asset class exposure for any one asset class comprises 35%, and for the recommending the new minimum and/or maximum allocation of said each asset in the investment portfolio and/or the new said optimization type for the investment portfolio, volatility of the investment portfolio is not higher than a benchmark volatility of the benchmark portfolio by a factor of 10%.

6. The computer-implemented method of claim 4 wherein the constraints determined for the investment portfolio based on the risk tolerance level comprise, for the medium risk tolerance:

available asset classes comprise equities, preferred shares, fixed income, and/or Real Estate Investment Trust (REIT), maximum asset class exposure for any one asset class comprises 40%, and for the recommending the new minimum and/or maximum allocation of said each asset in the investment portfolio and/or the new said optimization type for the investment portfolio, volatility of the investment portfolio is not higher than a benchmark volatility of the benchmark portfolio by a factor of 20%.

7. The computer-implemented method of claim 4 wherein the constraints determined for the investment portfolio based on the risk tolerance level comprise, for the high risk tolerance:

available asset classes comprise equities, preferred shares, fixed income, Real Estate Investment Trust (REIT), hybrid, energy, precious metals, and/or other metals, maximum asset class exposure for any one asset class comprises 40%, and for the recommending the new minimum and/or maximum allocation of said each asset in the investment portfolio and/or the new said optimization type for the investment portfolio, volatility of the investment portfolio is not higher than a benchmark volatility of the benchmark portfolio by a factor of 20%.

8. The computer-implemented method of claim 1 wherein the previously curated core portfolio comprises a defensive portfolio with a minimum number of independent factors contributing to returns of the core portfolio based on the greatest Eigen Values for at least a threshold percentage of the core portfolio's variance.

9. The computer-implemented method of claim 1 wherein the market data comprises m+n years of end-of-day asset price and distribution data, wherein the m years of the market data are used for the performing the PCA on the core portfolio and the investment portfolio and the n years of the market data are used for the analyzing the performance of the investment portfolio, wherein the n years are subsequent to the m years.

10. The computer-implemented method of claim 2 further comprising, if the second number of independent factors is not greater than the first number of independent factors:

providing a recommendation for the selection of the one or more assets to add to the core portfolio;

wherein the recommendation (i) includes no more than one asset that is of a similar asset type; (ii) limits asset class exposure according to the optimization type for the asset allocation of the investment portfolio; and (iii) does not exceed a configurable maximum number of assets for the investment portfolio.

11. The computer-implemented method of claim 2 wherein the optimization type for the asset allocation of the investment portfolio comprises: (i) equal weights by individual assets; (ii) equal weights by asset class; (iii) maximize returns based on CAGR (Compound Annual Growth Rate); (iv) maximize returns based on income; (v) minimize portfolio variance; and/or (vi) minimize taxes on income from a non-registered income portfolio.

12. The computer-implemented method of claim 2 wherein the input of the minimum and maximum allocation of said each asset in the investment portfolio comprises a value that simultaneously sets a range for the allocation of said each asset.

13. The computer-implemented method of claim 12 wherein the value that simultaneously sets the range for the allocation of said each asset sets the range for the allocation of said each asset while satisfying the constraints.

14. The computer-implemented method of claim 12 wherein the value that simultaneously sets the range for the allocation of said each asset comprises a value from a minimum value to a maximum value, wherein the minimum value represents equal weights of assets in the investment portfolio, and the maximum value represents a maximum range between the minimum and maximum allocation for each said asset in the investment portfolio.

15. The computer-implemented method of claim 2 wherein the analyzing the performance of the investment portfolio comprises the analyzing the performance of the investment portfolio (i) in isolation and/or (ii) in relation to the benchmark portfolio.

16. The computer-implemented method of claim 2 wherein the recommended new minimum and/or maximum allocation of said each asset in the investment portfolio and/or the new said optimization type for the investment portfolio comprises the new minimum and/or maximum allocation and/or the new said optimization type that yields a Sharpe Ratio for the investment portfolio that is both (i) better than the Sharpe Ratio of the benchmark portfolio and (ii) maximized while satisfying the constraints.

17. The computer-implemented method of claim 2 further comprising:

tracking performance of the optimized investment portfolio and the benchmark portfolio; and communicating the optimized investment portfolio performance and the benchmark portfolio performance.

18. A system for optimizing a composition of an investment portfolio, the system comprising:

at least one optimization computing device comprising one or more processors, a non-transitory computer readable medium and a communication interface device, the one or more processors communicatively coupled to the non-transitory computer readable medium and the communication interface device;

the non-transitory computer-readable medium comprising computer-executable instructions stored thereon that when executed by the one or more processors cause the one or more processors to:

receive, via the communication interface device, a risk tolerance level for the investment portfolio;

receive, via the communication interface device, an investment objective;

determine constraints for the investment portfolio based on the risk tolerance level;

receive, via the communication interface device, a selection of a previously curated core portfolio;

receive, via the communication interface device, a selection of one or more assets to add to the core portfolio, to generate the investment portfolio;

determine if the investment portfolio satisfies the constraints;

if the investment portfolio satisfies the constraints:

receive, via the communication interface device, a selection of a benchmark portfolio comprising the core portfolio or another selected portfolio;

obtain, via the communication interface device, market data for (i) the core portfolio and the benchmark portfolio, and (ii) the investment portfolio;

perform Principal Component Analysis (PCA) on the market data of the core portfolio to generate a first factor model having a first number of independent factors representing or exceeding a threshold percentage of portfolio variance;

perform said PCA on the market data of the investment portfolio to generate a second factor model having a second number of independent factors representing or exceeding said threshold percentage of portfolio variance;

compare the second number of independent factors to the first number of independent factors;

and conditionally initiate an automated portfolio optimization operation only when the second number of independent factors exceeds the first number of independent factors, and wherein the automated portfolio optimization operation comprising generating recommended asset allocation constraints for the investment portfolio.

19. The system of claim 18 wherein computer-executable instructions when executed by the one or more processors further cause the one or more processors to:

determine if the second number of independent factors is greater than the first number of independent factors;

if the second number of independent factors is greater than the first number of independent factors:

receive, via the communication interface device, input of an optimization type for asset allocation of the investment portfolio;

receive, via the communication interface device, input of minimum and maximum allocation of each asset in the investment portfolio;

analyze performance of the investment portfolio;

if the performance of the investment portfolio is below a threshold performance, recommend a new minimum and/or maximum allocation of said each asset in the investment portfolio and/or a new said optimization type for the investment portfolio, based on the analysis of the performance of the investment portfolio; and receive, via the communication interface device, an acceptance of the recommendation of the new minimum and/or maximum allocation of said each asset in the investment portfolio and/or the new optimization type, to generate an optimized investment portfolio.

20. The system of claim 19 wherein the input of the minimum and maximum allocation of said each asset in the investment portfolio comprises a value that simultaneously sets a range for the allocation of said each asset, the value comprising a value from a minimum value to a maximum value, wherein the minimum value represents equal weights of assets in the investment portfolio, and the maximum value represents a maximum range between the minimum and maximum allocation for each said asset in the investment portfolio.

* * * * *